US010295436B2

United States Patent
Conner et al.

(10) Patent No.: US 10,295,436 B2
(45) Date of Patent: May 21, 2019

(54) STRUCTURED LIGHT MEASURING APPARATUS AND METHODS

(71) Applicant: HONEYWELL INTERNATIONAL INC., Morris Plains, NJ (US)

(72) Inventors: Richard David Conner, Peoria, AZ (US); Bruce David Reynolds, Chandler, AZ (US); Jonathan C. Bittner, Mesa, AZ (US); Srinivas Jaya Chunduru, Chandler, AZ (US); Bruce D. Wilson, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/072,560

(22) Filed: Mar. 17, 2016

(65) Prior Publication Data

US 2017/0268963 A1    Sep. 21, 2017

(51) Int. Cl.
*G01M 5/00* (2006.01)
*G01B 11/00* (2006.01)
*G01M 15/14* (2006.01)

(52) U.S. Cl.
CPC ............ *G01M 15/14* (2013.01); *G01B 11/00* (2013.01); *G01M 5/0016* (2013.01); *G01M 5/0091* (2013.01)

(58) Field of Classification Search
CPC ...... G01M 15/14; G01B 11/00; G01B 11/167; G01B 11/25; G01B 11/2518
See application file for complete search history.

(56) References Cited

U.S. PATENT DOCUMENTS

| | | | |
|---|---|---|---|
| 5,365,787 A | 11/1994 | Hernandez et al. | |
| 9,410,436 B2* | 8/2016 | Kulathu | F01D 5/10 |
| 2003/0184767 A1* | 10/2003 | Tu | G01B 11/028 |
| | | | 356/614 |
| 2005/0278127 A1 | 12/2005 | Griffin et al. | |
| 2007/0091321 A1* | 4/2007 | Hu | F01D 5/005 |
| | | | 356/604 |
| 2007/0217672 A1* | 9/2007 | Shannon | G06T 7/0006 |
| | | | 382/152 |
| 2009/0313823 A1* | 12/2009 | Rockstroh | B23P 6/007 |
| | | | 29/889.1 |
| 2011/0293403 A1* | 12/2011 | Badami | F01D 21/003 |
| | | | 415/118 |

(Continued)

FOREIGN PATENT DOCUMENTS

WO    2010045924 A1    4/2010

OTHER PUBLICATIONS

Ge Yao; Process and Structural Health Monitoring for Wind Turbine Applications Using Optical Fibre Sensors; A Thesis Submitted for the Degree of Doctor of Philosophy Department of Civil and Environmental Engineering National Unversity of Singapore 2014.

(Continued)

*Primary Examiner* — Michael A Lyons
(74) *Attorney, Agent, or Firm* — Lorenz & Kopf, LLP

(57) ABSTRACT

A field deployable, portable structured light measurement (SLM) apparatus, together with a structured light measurement process to manage part to part variation in production and in the field, to support both rotor airfoil mistuning and rotor airfoil repair limits.

7 Claims, 4 Drawing Sheets

(56) References Cited

U.S. PATENT DOCUMENTS

| | | | |
|---|---|---|---|
| 2012/0290259 A1* | 11/2012 | McAfee | G01B 21/047 |
| | | | 702/155 |
| 2012/0293646 A1 | 11/2012 | Singh et al. | |
| 2013/0003071 A1 | 1/2013 | Mamidipudi et al. | |
| 2013/0114088 A1 | 5/2013 | Newman | |
| 2013/0194567 A1* | 8/2013 | Wan | G01B 11/14 |
| | | | 356/152.1 |
| 2014/0112760 A1* | 4/2014 | Duong | F01D 5/16 |
| | | | 415/119 |
| 2015/0089809 A1* | 4/2015 | Guo | B23P 15/02 |
| | | | 29/889.7 |
| 2016/0027294 A1* | 1/2016 | Magnus | F03D 80/40 |
| | | | 340/514 |
| 2017/0148152 A1* | 5/2017 | Germann | G06T 7/004 |
| 2017/0175776 A1* | 6/2017 | Theratil | F04D 29/666 |
| 2017/0180679 A1* | 6/2017 | Ozturk | H04N 7/18 |

OTHER PUBLICATIONS

Extended EP Search Report for Application No. 17154497.6 dated Aug. 10, 2017.
EP Examination Report for Application No. 17154497.6 dated Apr. 20, 2018.

* cited by examiner

STRUCTURED LIGHT MEASURING APPARATUS AND METHODS

TECHNICAL FIELD

This invention generally relates to structured light measuring apparatus and methods, and more particularly, this invention relates to apparatus and methods of structured light measurement and assessment of turbine engine components during production and maintenance.

BACKGROUND

There are many benefits of thin airfoils in gas turbine engine blisk fans and compressor rotors. However, when airfoils are thinned the vibratory response strength can have potentially deleterious effects on the engine or aircraft. Such effects can be reduced by mistuning the rotor. That is, shifting the natural frequencies of some airfoils within the same rotor. Achieving and maintaining the level of mistuning can ensure proper operation of the engine. One of the challenges associated with mistuning is determining and monitoring the actual level of mistuning.

To control the level of rotor mistuning in a product, both the nominal design level and measurement capabilities play key roles. Typically, the nominal design level of mistuning is set to accommodate manufacturing and anticipated field operation variations in geometry and the resulting mistuning level. This can result in significant airfoil-to-airfoil frequency variation, which can have negative impacts on performance. To produce airfoils to these specifications typically relies on sophisticated manufacturing processes.

Currently, the rotor mistuning measurement process is a tedious bench test that inherently has a large amount of variation and therefore a potential risk of inaccurately predicting the mistune of a rotor. In addition, it is labor intensive and highly dependent on the skill of the technician testing the rotor. Also, the bench test process requires that the part be taken to a lab for testing. Moreover, there is no easy to use process to check the level of mistuning in the field.

In addition to intentional mistuning of rotor and fan airfoils, airfoils have allowable repair limits set to ensure consistent operation of the entire population. If the specific geometry of the airfoil is known an increased level of allowable repair can be used. This requires a process to measure the airfoil geometry and analyze the specific repair. It's desirable that this measurement and repair be made in the field, and for example, on-wing in order to minimize cost and down time.

SUMMARY

There are many benefits that may be obtained from making structured light measurements of gas turbine components, such as airfoils, both in production and in field operation. In the herein described embodiments, structured light geometric measurements may be made of actual gas turbine airfoil hardware and analysis may be made to determine/control aero-mechanical, aero-elastic and acoustic characteristics of the components and the engine as a whole. The measured airfoil shapes may be analyzed using low fidelity or high fidelity analysis tools. The airfoil stresses, frequencies, mistuning levels, aerodynamics and performance, flutter and acoustic determinations can be made based on the produced hardware, or assessed after an in-service period. Thus, analysis may be made in a production environment to manage product performance and may be made on fielded product to improve performance, maintainability and reliability.

To make use of structured light measurements in gas turbine engine production and for field support, in accordance with herein described embodiments an apparatus and method for optical inspection using structured light measurement of the gas turbine airfoils is provided. The apparatus and methods may provide computed characteristics such as aero-mechanical, aero-elastic and acoustic analysis of the airfoil from the optical system data, digitally tying the measurement to predicted characteristics. For example, an apparatus and method may use structured light measurement to obtain gas turbine engine part characteristic data for mechanical analysis of the part. The apparatus and method may find further use to calculate a repairability of an airfoil during manufacturing or while in service.

In another herein described embodiment set in a production environment, a structured light measuring apparatus and process can be used to collect and feedback geometry information and aero-mechanical data. This reduces cost in developing production by collecting a more comprehensive set of data in shorter time with high accuracy. Additionally, the same feedback can be used to monitor production to understand and control variation providing the same benefits. Also for certain gas turbine engine components, such as airfoils and bladed disks, the data can be maintained and subsequently used on a comparison basis for fast characterization of deterioration or damage as it accumulates hours of service.

In another herein described embodiment for individual blade repair, structured light measurement apparatus and methods extend to aftermarket field service limits, by providing specific geometry and frequency response for detailed stress analysis of any airfoil being considered for repairs or maintenance. This facilitates more accurate evaluation of normal and special cause service related damage. With the benefit of more accurate actual geometry for analysis, repairs may be suggested and made. Overall maintenance time and cost may be reduced while improving the useful life of the component, especially airfoil and bladed disk applications used in fans and compressors.

In additional herein described embodiments, the outputs of the structured light measurement apparatus may be combined with existing processes used to generate airfoil models and compute frequencies and stress. An automated apparatus and method may be used to support fielded products.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
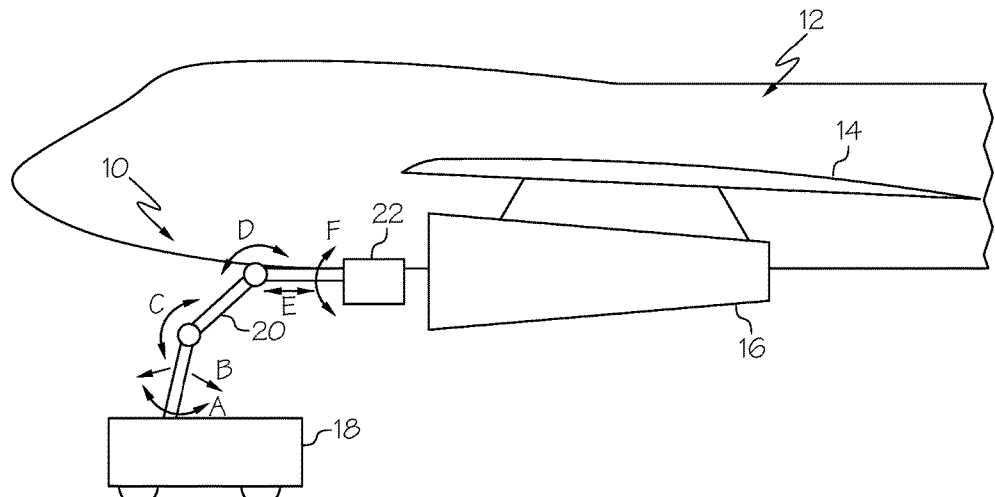
FIG. 1 is a schematic diagram of a structured light measuring (SLM) apparatus in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of electrical components, e.g., sensors, integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the systems described herein are merely exemplary embodiment of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIG. 1 illustrates a field deployable, portable structured light measurement (SLM) apparatus 10, together with which will be described a structured light measurement process to manage part to part variation, individual part and part to part frequency and frequency distribution in production and in the field, to support both rotor blade mistuning and rotor airfoil repair limits at a more refined level than was previously possible. The apparatus 10 facilitates the implementation of processes that include SLM to provide a model of every airfoil on a rotor in production or in the field. From this model, all airfoil operational characteristics are determined. Such characteristics may include determination of aero-mechanical, aero-elastic and acoustic characteristics. In addition, prediction of the natural frequencies of each airfoil, airfoil to airfoil frequency distribution and the associated mistuning level of the rotor or blisk is possible.

As depicted in FIG. 1 the apparatus 10 is disposed, within the field, adjacent an aircraft 12 having a wing 14 on which is supported a gas turbine engine 16. The apparatus 10 makes possible on-wing measurement of a component of the gas turbine engine 16. The apparatus 10 may include a portable base structure 18 supporting an articulating member 20 onto which is disposed a structured light measurement (SLM) device 22. The articulating member 20 permits multiple axes of translation and rotation of the SLM device 22 relative to the engine 16, and therefore components of the engine 16. These axes of translation and rotation are depicted by arrows A through F. Other degrees of freedom may be provided. Moreover, other suitable structures and devices to position and move the SLM device 22 adjacent to and about the aircraft 12 and engine 16, in particular, may be employed, as the skilled person will appreciate. The device 22 can also be directly affixed to the engine at access port location(s) to allow structured light measurements to be made.

Figure 2:
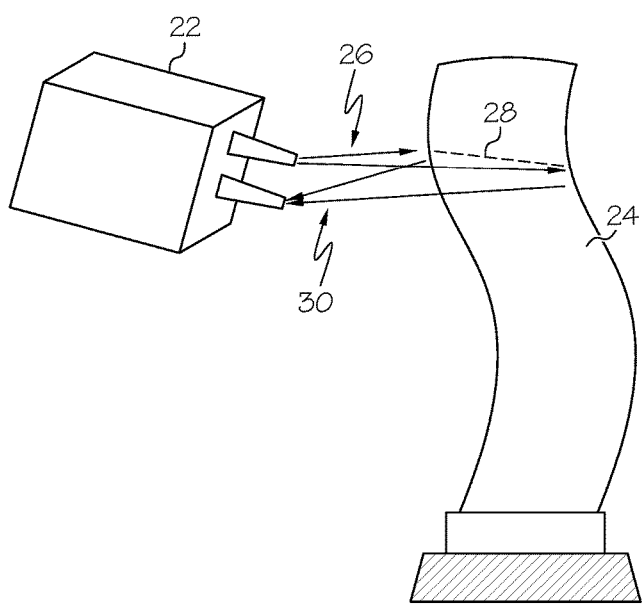
FIG. 2 is a further schematic diagram of a SLM apparatus as depicted in FIG. 1.

FIG. 2 schematically depicts the SLM device 22 affecting optical measurement of a gas turbine engine component, and for example, an airfoil 24. Structured light measurement technology is known, and the SLM device 22 may be of suitable construction to be adapted for use within the apparatus 10. In operation, the SLM device 22 directs light energy 26 at the component 24 and projects the light energy as a beam 28 on the component 24. The SLM device 22 is further configured to detect reflected light energy 30, and from that to create a model of the airfoil 24 in digital or other electronic form.

Figure 3:
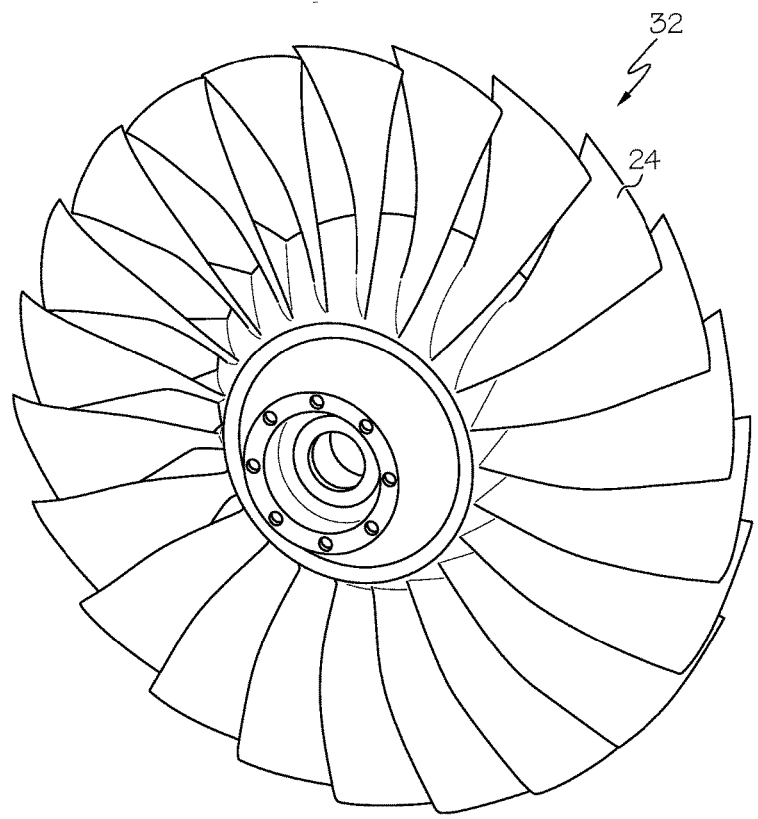
FIG. 3 is a graphic depiction of a gas turbine engine component.

As shown in FIG. 2, the airfoil 24 is secured to a test bed or test fixture, as might be the case during production of the airfoil 24 and/or in the instance that the airfoil 24 is removed the engine 16 for analysis and possible repair after an in-service period. Alternatively, and often preferred, the airfoil 24 remains associated with a compressor rotor or blisk fan, such as blisk fan 32 depicted in FIG. 3.

Figure 4:
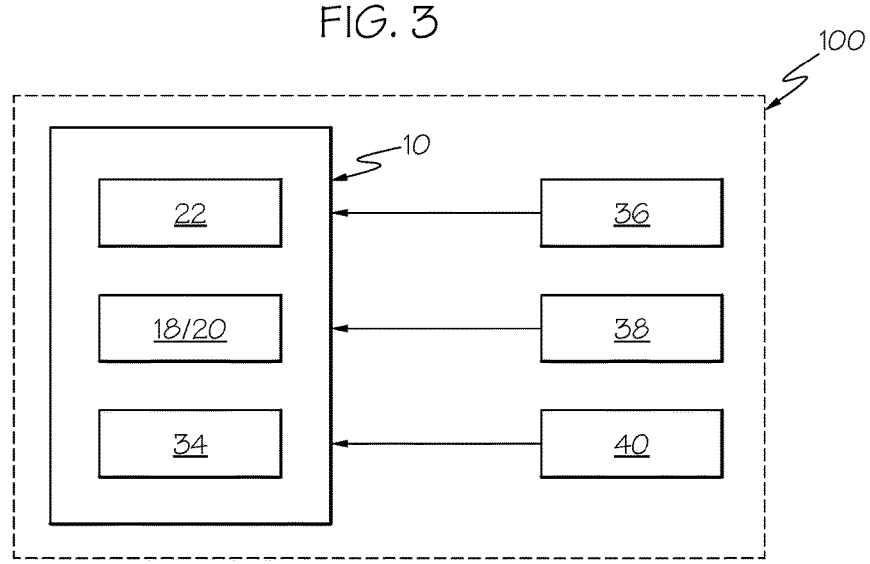
FIG. 4 is a functional block diagram of a SLM apparatus and a system incorporating a SLM apparatus in accordance with herein described embodiments.

FIG. 4 depicts functional aspects of the apparatus 10 and further depicts a system 100 providing structured light measurement and assessment of turbine engine components during production and maintenance. The apparatus 10 includes as described a base structure 18 and articulating member 20, which have suitable power and controls (not depicted) to control the movement of the apparatus 10 generally and the SLM device 22 particularly. The apparatus 10 further includes an electronic control unit 34. The electronic control unit 34 includes suitable power, memory and processing capability, such as a general purpose or application specific microprocessor operating according to a control program stored in associated memory, to direct the operation of the apparatus 10 in accordance with the herein described embodiments.

The control unit 34 further includes capability to interface and communicate with various systems external to the apparatus 10. As depicted, the system 100 includes interfaces to and is capable of accessing analysis protocols 36, design data 38 and data analytics system 40.

In operation, the apparatus 10, via the control unit 34, accesses an analysis protocol 36 that will govern the operation of the apparatus 10 to undertake an analysis of an engine component, such as airfoil 24. Here, the apparatus 10 may be commanded to undertake measurement of the airfoil 24, in accordance with the analysis protocol 36, to obtain measurement data of the airfoil 24. In this case, the apparatus 10 obtains data sufficient to create an electronic model of the airfoil 24. The apparatus 10 itself may be configured to determine an airfoil model. Alternatively, the apparatus 10 may communicate raw data to another element of the system 100, such as the data analytics system 40 to determine the model. In either case, the raw data or the determined model being communicated from the apparatus 10, the data analytics system 40 may access design data for the airfoil 24 in order to determine whether airfoil 24 remains within design specifications for use within the engine 16.

In the foregoing discussion, the apparatus 10 interfaces or communicates with additional sources of data and analytics processing as part of a system 100. It will be appreciated that the apparatus 10 may incorporate memory to retain the analysis protocol 36 and design data 38 and processing capability to provide analysis of the airfoil model.

As is appreciated, the apparatus 10, whether configured to be standalone or configured as part of a system 100, provides a flexible, field-deployable gas turbine engine component measurement and analysis tool. In this respect, the apparatus 10 offers aircraft operators the capability to in-field, and in particular on-wing, assess the condition of gas turbine engine components. In particular, by measuring each airfoil of an engine compressor rotor or blisk fan, determining for each airfoil a model providing an airfoil natural frequency and determining a frequency distribution of all airfoils within rotor or blisk, it is possible to on-wing assess the state of rotor or blisk mistuning using structured light measurement. Initial results comparing structured light measured rotor geometry with finite element analysis frequency predictions to acoustic ring signature (ARS) frequency measurements shows very good correlation and confirms the ability to predict airfoil frequencies in a non-contact manner, and using an apparatus 10 in accordance with the herein described embodiments.

Apparatus 10 may find application within the production environment. Typical production measuring apparatus are contained in labs or dedicated measuring facilities. The apparatus 10 is deployable to be near the manufacturing and/or assembly processes, meaning that production components and assemblies do not have to be removed from the production environment, delivered to a measuring facility, and then, if approved, returned to the production environment. Hence, an apparatus such as the apparatus 10, greatly enhances production efficiency while improving quality and yield.

Figure 5:
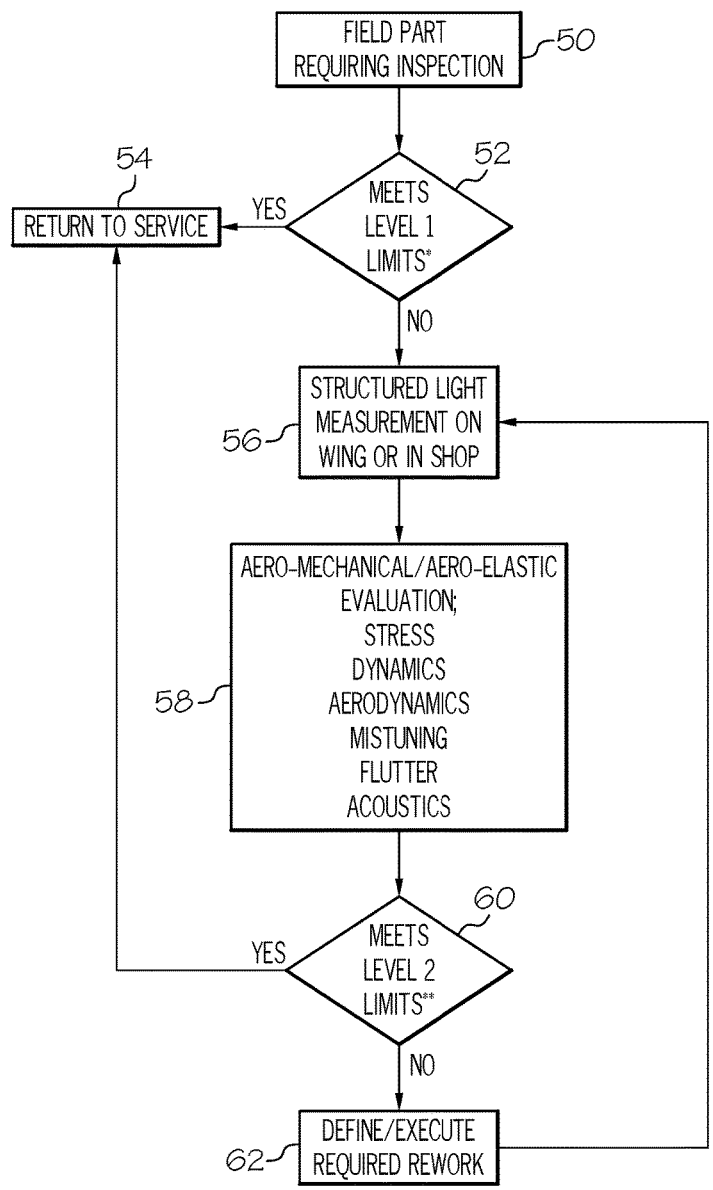
FIG. 5 is a flow diagram of a field-based turbine engine airfoil repair process using a SLM apparatus such as shown in FIG. 1.
Figure 6:
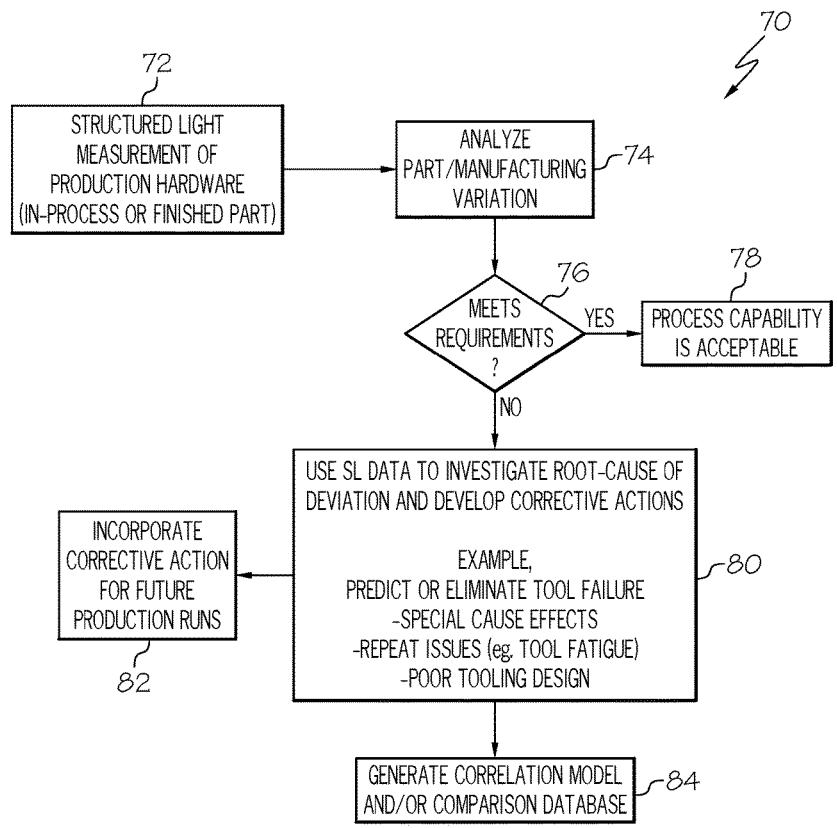
FIG. 6 is a flow diagram of a production-based turbine engine airfoil repair process using a SLM apparatus such as shown in FIG. 1.

FIGS. 5 and 6 illustrate processes utilizing the apparatus 10 and/or the system 100 of the foregoing described embodiments. In connection with the process illustrated in FIG. 5, beginning with a determination that a fielded part requires inspection 50, the apparatus 10 is field-deployed, such as depicted in FIG. 1. A first assessment 52 of an engine component is made, and if the component passes the first assessment, it is returned to service 54. If the component fails the first assessment, at 56 the apparatus 10 is used to generate a structured light measurement (SLM)/SLM-based model of the component. The apparatus 10 may incorporate analytics, or the measurement data may be communicated to an analytics tool such as described in connection with the system 100, such that an evaluation of the SLM measurement data relative to stress, dynamics, aerodynamics, mistuning, flutter, acoustics and aero-elastics data 58 is made. If the measured component passes this second evaluation, 60, the component is returned to service 54. If it fails this second assessment, a repair/rework plan is defined and executed, 62. Thus a process of assessing a component of a gas turbine engine may include conducting first and second assessments of the component, wherein at least one of the assessments is a SLM assessment using a field deployable, portable SLM apparatus.

In connection with the process 70 illustrated in FIG. 6, a deployable/portable SLM apparatus, such as SLM apparatus 10 is utilized in a production environment. A deployable/portable SLM apparatus is used to generate SLM measurement data/SLM model data of a finished or intermediate component, 72. The data/model or analyzed, 74, is used to determine variation data whether do to design or manufacturing process. If the data/model indicate the part meets requirements, 76, the design/process indicates acceptable capability 78. Otherwise, analysis is undertaken, 80, to determine a cause of the variation, and corrective action is determined, 82. Thus, a process of assessing a component design and/or manufacturing process may include using a site deployable/portable SLM apparatus, such as apparatus 10, to assess various stages of a manufacturing process. The model data and analysis data may be utilized to develop correlation models or comparison database to evaluate production and/or fielded hardware, 84.

As will be appreciated from the foregoing discussion, actual airfoil geometries may be tracked in production and performance of the product can be more accurately controlled. In the field, measured airfoils can be evaluated for potential repairs beyond the current state of the art field limits and quickly evaluated for continued operation on wing. The optical non-contact processes described may be performed on the wing of the aircraft or in the shop, streamlining maintenance or repair of mistuned fan disk and compressor rotors and repair of individual blades.

Additional benefits are achieved by creating confidence in the mistuning of thin airfoils used in gas turbine engine blisk fan and compressor rotors. As these airfoils are thinned, they become increasingly sensitive to vibratory response, which can be strong enough to lead to cracking or potential damage to the engine or aircraft. Apparatus and methods in accordance with the herein described embodiments permits confirmation of proper mistuning of such fans and rotors.

A further beneficial field deployable apparatus and process to determine both rotor or blisk airfoil mistuning and airfoil repair limits is provided. In these processes, SLM is employed to provide a model of every airfoil on a rotor and from this model, all airfoil natural frequencies may be analytically determined. From the predictions of the natural frequencies of each airfoil the mistuning level of the rotor may be determined. In addition, airfoils can be evaluated for potential repairs beyond the field limits and quickly evaluated for continued operation on wing without removal the engine or engine components.

Further benefits may be achieved in connection with individual blade repair. The apparatus and methods herein described in accordance with the various embodiments allow determination of aftermarket field service limits, by providing specific geometry for detailed stress analysis of any airfoil being considered for repairs or maintenance. This facilitates accurate evaluation of normal and special cause service related damage. With the benefit of more accurate actual geometry for analysis, repairs may be made beyond traditional limits. This reduces maintenance time and cost while improving fan and compressor performance.

While several exemplary embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of assessing a component of a gas turbine engine while disposed on the gas turbine engine using a field deployable, portable structured light measuring apparatus including at least a portable base structure and an articulating arm member, the method comprising the steps of:

deploying the field deployable, portable structured light measuring apparatus relative to a gas turbine engine containing the component, the component including at least one of an airfoil of a compressor rotor or blisk fan of the gas turbine engine to be assessed while the gas turbine engine is disposed within its field of use installed on an aircraft;

using the field deployable, portable structured light measuring apparatus to generate structured light measurement data of the airfoil;

generating a model of an entire operational portion of the airfoil using the structured light measurement data representative of at least one operational characteristic data of the airfoil at least including a natural frequency of the airfoil; and assessing a condition of the airfoil based upon the airfoil operational characteristic data and at least one comparison data.

2. The method of claim 1, wherein the at least one operational characteristic data comprises a natural frequency of each of a plurality of airfoils of the compressor rotor or blisk fan.

3. The method of claim 1, wherein the at least one operational characteristic data comprises a frequency distribution of frequencies of each of a plurality of airfoils of the compressor rotor or blisk fan.

4. The method of claim 1, wherein the at least one operational characteristic data comprises assessment data selected from one of: stress, frequency, performance and acoustics.

5. The method of claim 1, wherein the at least one operational characteristic data comprises a repairability of the airfoil.

6. The method of claim 1, wherein the at least one operational characteristic data comprises a conformance to specifications of the airfoil.

7. The method of claim 1, wherein the model of the airfoil comprises a model representing characteristics of an entire operational surface portion of each of a plurality of airfoils within the compressor rotor or blisk fan.

* * * * *